(12) United States Patent
Torres

(10) Patent No.: US 8,786,991 B1
(45) Date of Patent: Jul. 22, 2014

(54) AUTOMATED THREE PHASE POWER MONITORING SYSTEM

(71) Applicant: Michael A. Torres, Newbury Park, CA (US)

(72) Inventor: Michael A. Torres, Newbury Park, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 114 days.

(21) Appl. No.: 13/627,514

(22) Filed: Sep. 26, 2012

(51) Int. Cl.
*H02H 3/00* (2006.01)

(52) U.S. Cl.
USPC .......................................................... 361/79

(58) Field of Classification Search
USPC .......................................................... 361/79
See application file for complete search history.

(56) References Cited

U.S. PATENT DOCUMENTS

| 5,606,480 A * | 2/1997 | Nevo ................................ 361/46 |
| 2002/0032535 A1* | 3/2002 | Alexander et al. ............... 702/64 |
| 2010/0231150 A1* | 9/2010 | Tan et al. ..................... 318/400.3 |

\* cited by examiner

*Primary Examiner* — Scott Bauer
(74) *Attorney, Agent, or Firm* — Christopher L. Blackburn; James M. Saunders

(57) ABSTRACT

Embodiments of the invention relate to automated three phase power monitoring systems. Embodiments of the invention include a zero crossing activated switch having an overload condition signal input that is electrically connected to a signal output terminal. The zero crossing activated switch prohibits conduction of the overload condition signal to a neutral ground RMS reactive breaker control mechanism until the zero crossing activated switch determines that at least one of three alternating currents crosses zero relative to a neutral signal.

8 Claims, 6 Drawing Sheets

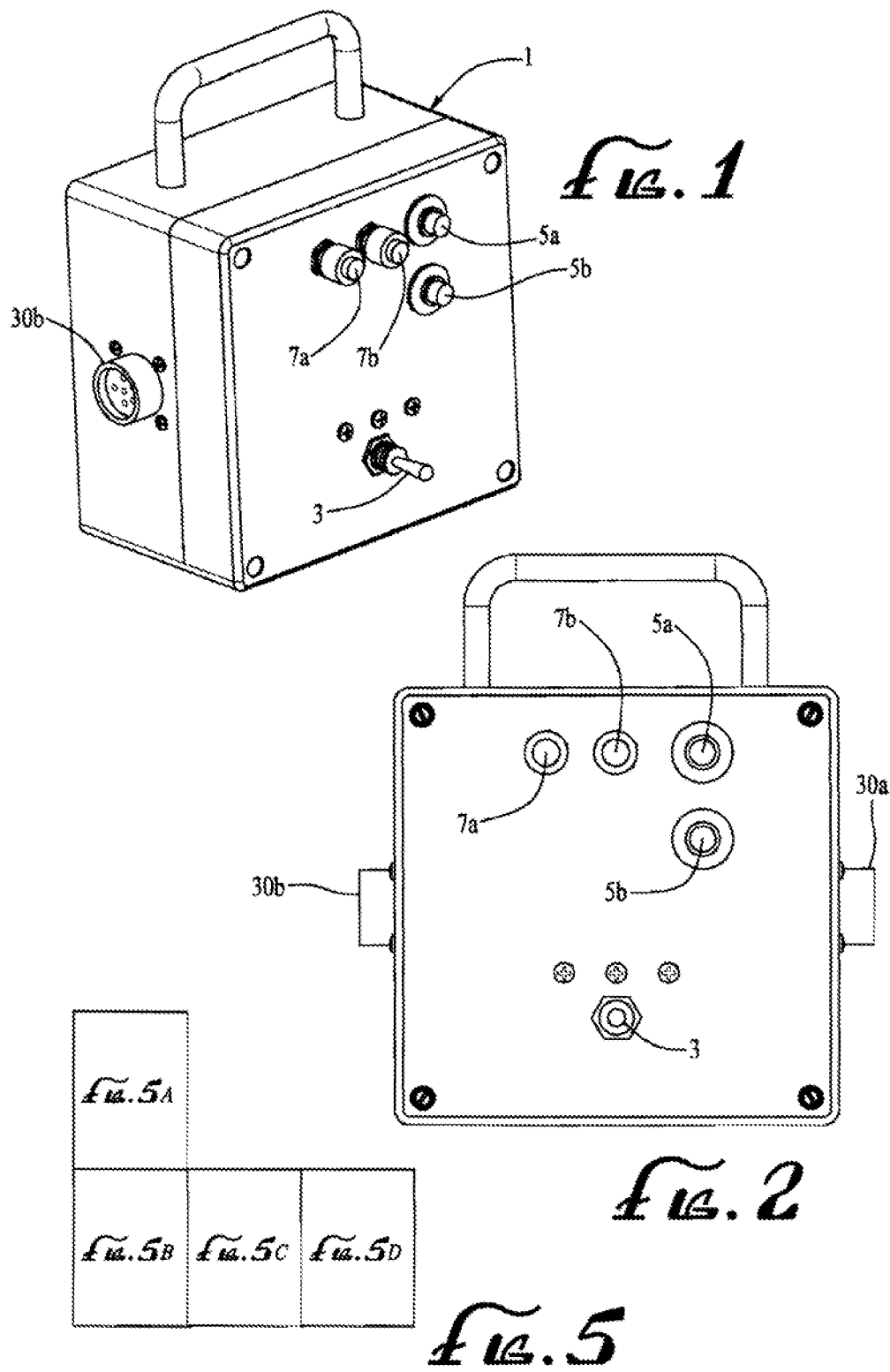

AUTOMATED THREE PHASE POWER MONITORING SYSTEM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to three-phase power system monitoring.

BRIEF DESCRIPTION OF THE DRAWINGS

FIG. 1 is a side perspective view of an embodiment of a system case including a system output terminal, a switch, functional buttons, and indicators.

FIG. 2 is a top view of an embodiment of a system case including system input and output terminals, a switch, functional buttons, and indicators.

FIG. 5 illustrates how to combine FIGS. 5A-5D to arrive at a single circuit diagram.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Three-phase electric power is a method of alternating-current electric power generation, transmission, and distribution. In a three-phase system three circuit conductors carry three alternating currents (of the same frequency) which reach their instantaneous peak values at different times. Taking one conductor as the reference, the other two currents are delayed in time by one-third and two-thirds of one cycle of the electric current. This delay between phases has the effect of giving constant power transfer over each cycle of the current.

Figure 3:
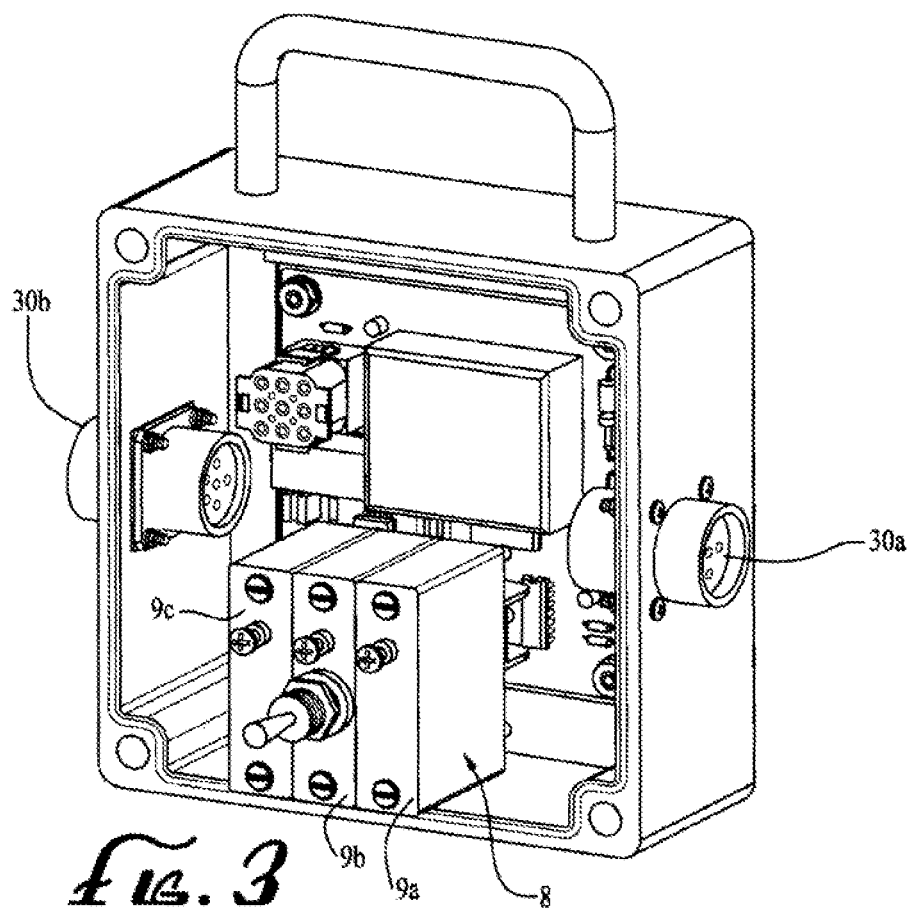
FIG. 3 is a side view of an embodiment of a system case and internal components including system input and output terminals, circuit breaker, and circuit card with voltage detection module circuit components.

FIGS. 1 and 2 illustrate a housing (case) 1, indicators 5a, 5b, manual activation switch lever 3, and buttons 7a, 7b. FIGS. 1, 2, and 3 also illustrate system input terminal 30a and system output terminal 30b. System input terminal 30 is adapted to receive a plurality AC signal wires. The signals applied to these wires are monitored by embodiments to the system. When a fault is determined to have occurred, the system prevents conduction of the signals applied to the input terminal from being conducted out of system output terminal 30b. If a system fault is present when the reset button is pressed, the fault will be detected and power will be removed. System has a "Lamp Test" button for periodically testing the external indicator lamps.

Figure 4:
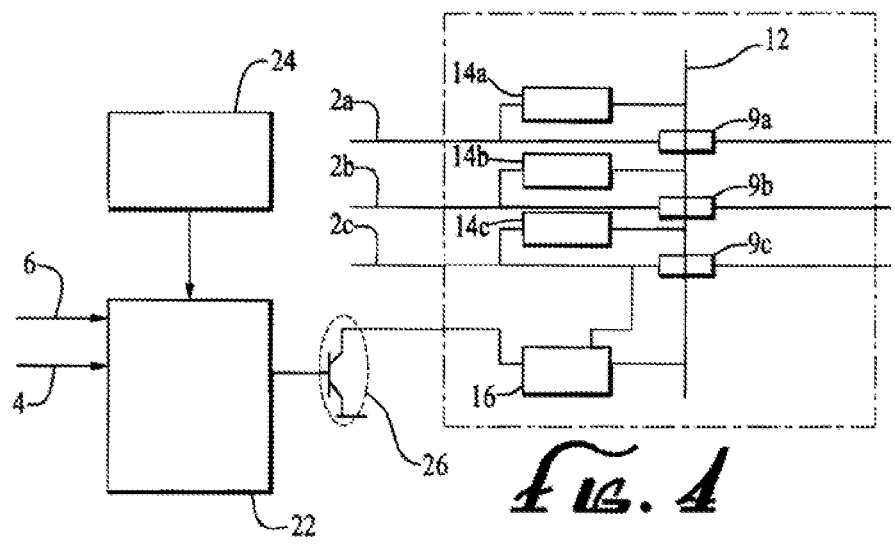
FIG. 4 is a block diagram illustrating interconnection of an system embodiments, including embodiments of ac/dc converter, voltage detection module, and circuit breaker.

With reference to FIG. 4, embodiments of the invention include a first circuit conductor 2a to carry a first alternating current, a second circuit conductor 2b to carry a second alternating current, and a third circuit conductor 2c to carry a third alternating current. First circuit conductor 2a, second circuit conductor 2b, and third circuit conductor 2c represent the three "energized", "hot" or "live" wires in three phase systems.

Three-phase systems being monitored using embodiments of this invention have a neutral wire 4. Neutral wire 4 allows the three-phase system to use a higher voltage while still supporting lower-voltage single-phase appliances. Neutral wire 4 carries the "imbalance" (or "neutral signal") between the power carried on the first circuit conductor 2a, second circuit conductor 2b and third circuit conductor 2c.

A circuit breaker is an automatically operated electrical switch designed to protect an electrical circuit from damage caused by overload or short circuit. Its basic function is to detect a fault condition and, by interrupting continuity, to immediately discontinue electrical flow. Unlike a fuse, which operates once and then must be replaced, a circuit breaker can be reset (either manually or automatically) to resume normal operation. Circuit breakers are made in varying sizes, from small devices that protect an individual household appliance up to large switchgear designed to protect high voltage circuits feeding an entire city.

With reference to FIG. 3, system embodiments of this invention including a three pole magnetic circuit breaker 8. With reference to FIG. 4, three pole magnetic circuit breaker has a common trip breaker 12, a first current sensor and circuit breaker control system 14a associated with first circuit conductor 2a, a second current sensor and circuit breaker control system 14b associated with first circuit conductor 2b, a third current sensor and circuit breaker control system 14c associated with first circuit conductor 2c, a neutral-ground RMS reactive breaker control 16, a first pole, a second pole, and a third pole.

With reference to FIG. 3, first pole 9a includes a first input terminal electrically connected to a first pole first contact and a first output terminal electrically connected to a first pole second contact. Second pole 9b includes a second input terminal electrically connected to a second pole first contact and a second output terminal electrically connected to a second pole second contact. Third pole 9c includes a third input terminal electrically connected to a third pole first contact and a third output terminal electrically connected to a third pole second contact.

With reference to FIG. 4, common trip breaker 12 is adapted to interrupt electrical flow across each of first pole, second pole, and third pole when (in response to) common trip breaker 12 is (being) activated. Each current sensor and circuit breaker control system 14a, 14b, 14c includes a current sensor to monitor current in its associated circuit conductor and a circuit breaker control mechanism that is energized when the current flowing on its associated circuit conductor exceeds a pre-determined current value; each current sensor and circuit breaker control system 14a, 14b, 14c is adapted to cooperate with the common trip breaker 12 such that energizing any of the circuit breaker control mechanisms 14a, 14b, 14c activates the common trip breaker 12. Neutral-ground RMS reactive breaker control is adapted to be energized in response to receiving an overload signal from voltage detection module 22; the neutral-ground RMS reactive breaker control 16 is adapted to cooperate with the common trip breaker 16 such that energizing the neutral-ground RMS reactive breaker control 16 activates the common trip breaker 12.

Embodiments further include an ac to dc converter 24 having a converter output terminal. AC to DC converter 24 is electrically connected to first conductor 2a, second conductor 2b, and third conductor 2c. AC to DC converter 24 is adapted to convert at least a portion of first alternating current, second alternating current, and/or third alternating current to direct current power and output direct current power through converter output terminal.

Embodiments further include a voltage detection module 22 having a plurality of electrical components, a signal output terminal electrically associated with neutral-ground RMS reactive breaker control 16, a neutral wire input electrically connected to said neutral wire 4, a ground wire input electrically connected to said ground wire 6, a power wire input electrically connected to AC to DC converter 24. The plurality of electrical components includes a plurality of active electronic components (on a circuit board) adapted to monitor an RMS voltage between neutral wire 4 and ground wire 6 using the plurality of active electronic components powered by at least a portion of said direct current power delivered from said converter output terminal to said power wire input. The plurality of electronic components is adapted to assert said overload condition signal to neutral-ground RMS reactive breaker control 16 when the plurality of electrical components have determined that the RMS voltage between neutral wire 4 and ground wire 6 is greater than a pre-determined voltage value for a pre-determined duration. Note that AC to DC converter 24 provides power for all modules and mechanisms in embodiments of the invention; as the AC to DC converter provided power is power from the signals being monitored (first alternating current, second alternating current, and third alternating current), no additional external power is required.

Voltage detection module 22 compares the RMS difference to a required threshold. If the threshold is exceeded, a fix clock is started. If threshold is not exceeded a new RMS value is processed. When the clock terminates and if the threshold is still exceeded, voltage detection module 22 is adapted to initiate a fault (meaning that overload condition signal is applied to neutral-ground RMS reactive breaker control 16). If the threshold is no longer exceeded, a new RMS value is processed. The system rejects short voltage pulses that exceed the voltage threshold. The clock is adapted to measure whether the "pre-determined" duration condition is satisfied; in some embodiments, the pre-determined duration is selected so that the system rejects voltage spikes produced when power is switched on the device and external test equipment.

Some embodiments include a fault light on case, illumination of which indicates that a fault has been initiated. When fault light is illuminated and the relay switch is triggered to remove power. When the Reset Button is pressed, the system begins processing a new RMS value. (The Relay switch must be switched on to begin applying power externally.)

With reference to FIG. 4, some embodiments include a zero-crossing activated switch 26 having an overload condition signal input electrically connected to said signal output terminal, said zero crossing activated switch being adapted to prohibit conduction of said overload condition signal to said neutral-ground RMS reactive breaker control mechanism until said zero crossing activated switch determines that at least one of first alternating current, second alternating current, and third alternating current crosses zero relative to the neutral signal.

In some embodiments including zero-crossing activated switch 26, zero-crossing activated switch 26 is a semiconductor having a base lead, a collector lead and an emitter lead. In these embodiments, emitter lead is electrically associated with one of first circuit conductor 2a, second circuit conductor 2b, and third circuit conductor 2c to monitor one of an applied of first alternating current, second alternating current, and third alternating current. In FIG. 1, zero-crossing activated switch is electrically associated with third circuit conductor 2c; however, in other embodiments, first circuit conductor 2a or second circuit conductor 2b is electrically associated with the zero-crossing activated switch. Collector lead is electrically associated with neutral. Zero-crossing activated switch 16 prohibits conduction of overload conduction signal to said neutral-ground RMS reactive breaker control 16 by remaining electrically open until said zero-crossing activated switch 26 determines that the applied of first alternating current, second alternating current, and third alternating current is at zero cross relative to neutral.

FIG. 5 illustrates how to combine FIGS. 5A, 5B, 5C, and 5D into a single circuit diagram. The single circuit diagram illustrated by combining FIGS. 5A, 5B, 5C, and 5D as illustrated in FIG. 5 illustrates electronic components adapted to monitor RMS voltage between neutral wire and ground wire and assert an overload condition when the plurality of electrical components have determined that the RMS voltage between neutral wire and ground wire is greater than a pre-determined voltage value for a pre-determined duration and AC current crosses zero relative to neutral; note that the embodiments illustrated in FIG. 5D includes a zero-crossing activated switch 26 having an overload condition signal input electrically connected to said converter output terminal. Zero crossing activated switch 26 is adapted to prohibit conduction of overload condition signal to neutral-ground RMS reactive breaker control mechanism until zero crossing activated switch 26 determines that at least one of first alternating current, second alternating current, and third alternating current crosses zero relative to said neutral signal.

Standard electronic component symbols are used to represent electronic components in FIGS. 5A-D, including resistors, capacitors, gates, microprocessors, and semiconductors. Inputs and Outputs are:

+5 VDC signal is produced by power regulator U9 and is derived from the +15 V Converter.

+15 VDC is produced by the AC to DC converter.

AGND is Analog Ground—for the +/−15 V supplies.

DGND is Digital Ground—for the +5 V supply.

Figure 5A:
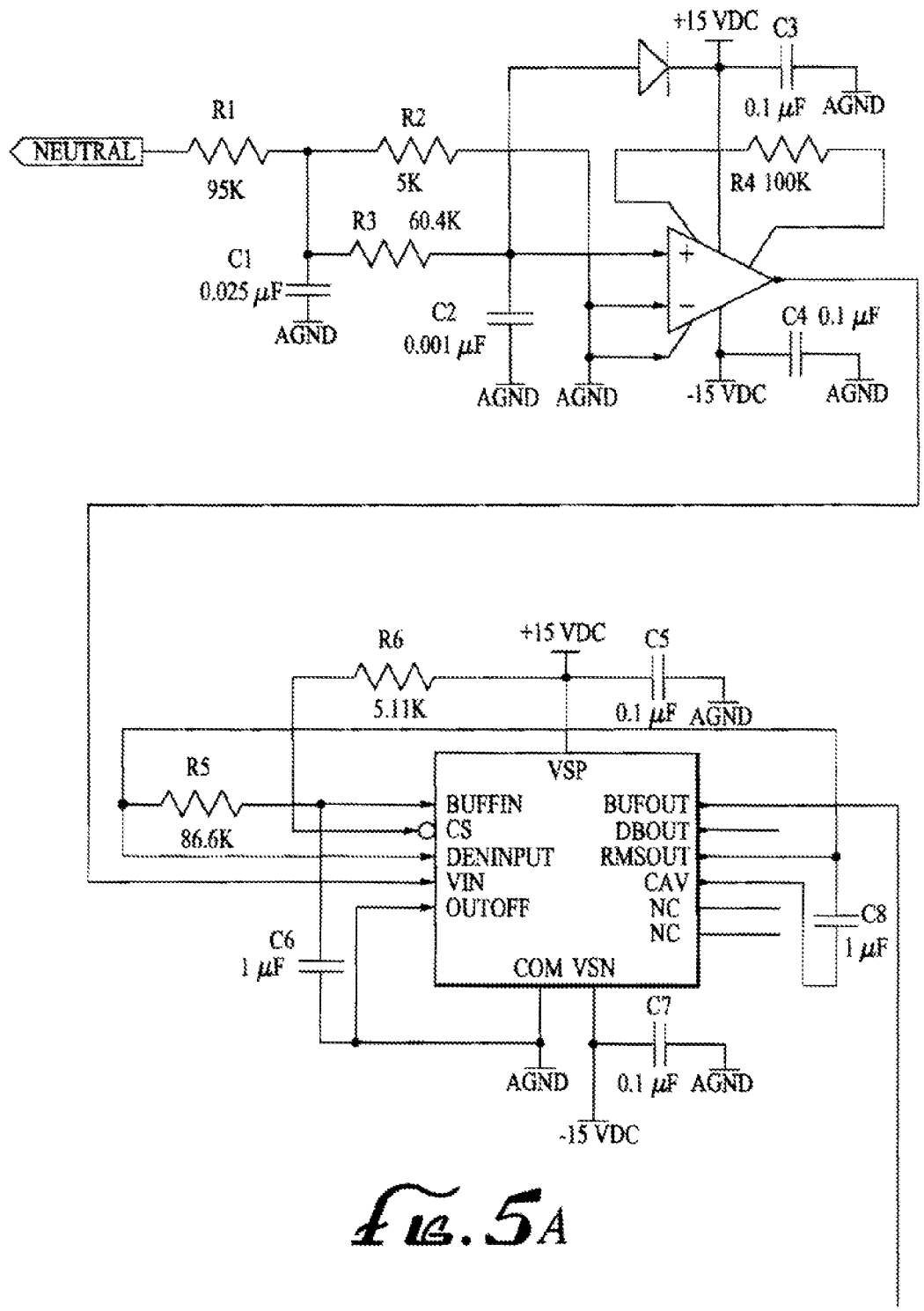
FIGS. 5A-5D combine to form a circuit diagram illustrating electrical components of a voltage detection module.
Figure 5B:
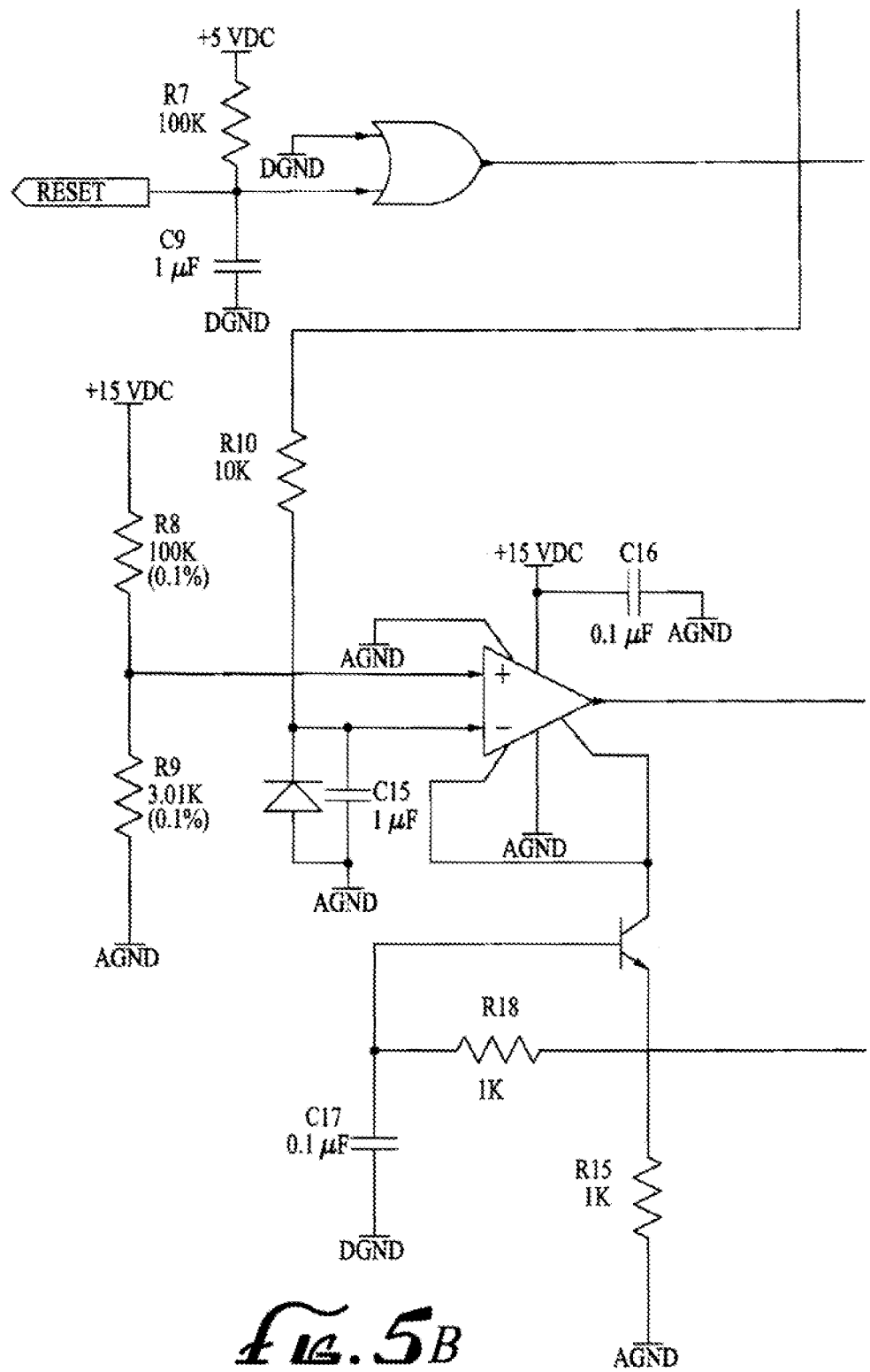
Figure 5C:
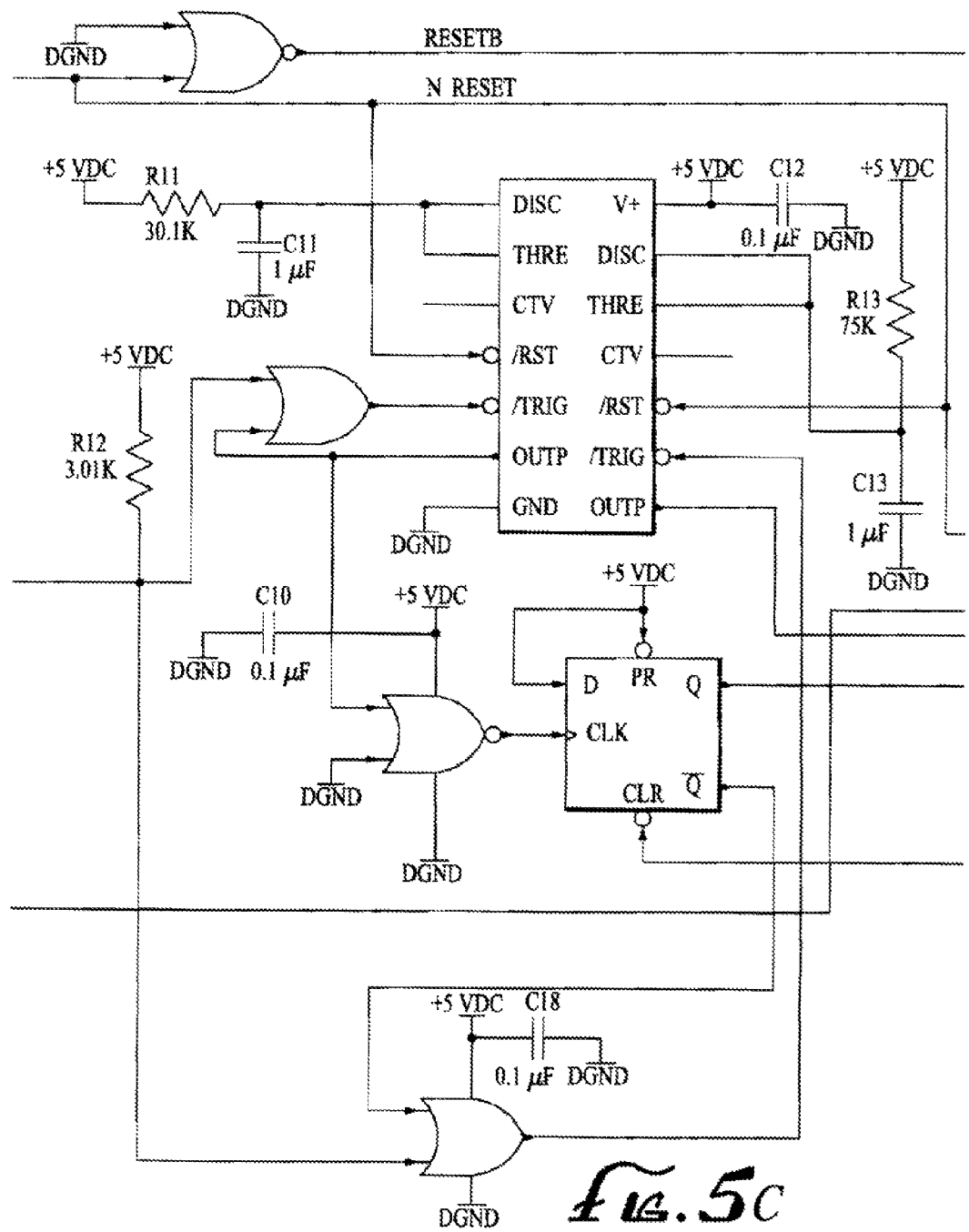

NEUTRAL Signal in FIG. 5A is neutral applied to circuit board.

Figure 5D:
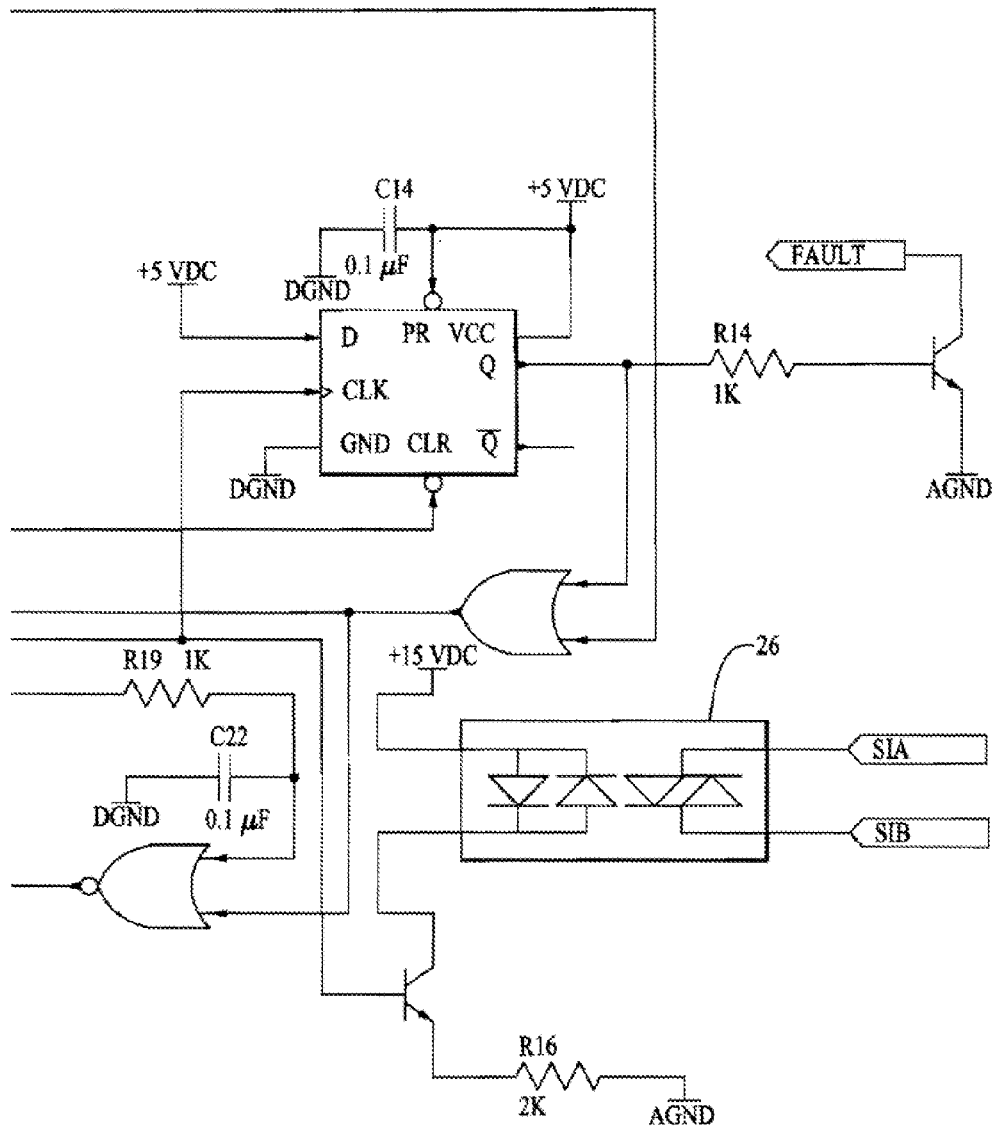

FAULT signal in FIG. 5D is signal indicating fault condition.

S1A signal in FIG. 5D is a trigger connection point connected to the neutral-ground RMS reactive breaker control.

S1B signal in FIG. 5D is a trigger connection point connected to Neutral off of the circuit board.

RESETB is a signal generated from Reset button that resets the state of the circuit card; RESETB is a positive going buffered reset signal.

N_RESET is a signal generated from Reset button that resets the state of the circuit card; N_RESET is a negative going buffered reset signal.

As standard component symbols are employed, and input and output symbols are identified, a person having ordinary skill will understand the operation of the diagram as illustrated without further description.

Methods of using system embodiments include:
applying a first alternating current to a first circuit conductor 2a;
applying a second alternating current to a second circuit conductor 2b;
applying a third alternating current to a third circuit conductor 2c;
monitoring said first alternating current, said second alternating current, and said third alternating current using at least one pilot device in a three pole circuit breaker;
converting a portion of said first alternating current, said second alternating current, and/or said third alternating current to direct current power;
carrying a neutral wire voltage on a neutral wire, wherein said neutral wire voltage corresponds to an imbalance between power carried on said first circuit conductor 2a, said second circuit conductor 2b and said third circuit conductor 2c;
monitoring an RMS difference between said neutral wire and a ground wire using a plurality of passive and active components in a voltage detection module, wherein said active components are powered by said direct current power; and
interrupting electrical flow across each of said first pole, said second pole and said third pole by tripping a common trip breaker in response to said active and passive components having determined that said RMS difference between said neutral wire voltage and said ground wire is greater than a pre-determined threshold voltage value for a predetermined duration.

In some method embodiments, the monitoring RMS difference between neutral wire and said ground wire step comprises:
generating a filtered voltage signal by removing all frequency components above 10 KHz between said neutral wire and said ground wire;
converting said filtered voltage signal to said RMS difference;
comparing said RMS difference to said pre-determined voltage value; and
measuring a duration for which said RMS difference continuously exceeds said pre-determined voltage value.

In some embodiments, the tripping a common trip breaker step comprises:
asserting an overload signal from said voltage detection module to a zero-crossing activated switch; and
conducting said overload signal from said zero-crossing activated switch to a neutral-ground RMS reactive breaker control mechanism adapted to trip said common trip breaker in response to at least one of said first alternating current, said second alternating current, and said third alternating current crossing zero.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:
1. A power monitoring system, comprising:
a first circuit conductor to carry a first alternating current;
a second circuit conductor to carry a second alternating current;
a third circuit conductor to carry a third alternating current;
a ground wire to carry a ground signal;
a neutral wire to carry a neutral signal;
a three pole magnetic circuit breaker having a common trip breaker, a first current sensor and circuit breaker control system associated with said first circuit conductor, a second current sensor and circuit breaker control system associated with said second circuit conductor, a third current sensor and circuit breaker control system associated with said third circuit conductor, a neutral-ground RMS reactive breaker control, a first pole associated with said first circuit conductor, a second pole associated with said second circuit conductor, and a third pole associated with said third circuit conductor; wherein said common trip breaker is adapted to interrupt electrical flow across each of said first pole said second pole and said third pole when current flowing through any of said first input terminal said second input terminal and said third input terminal is greater than a predetermined current value; wherein said common trip breaker is adapted to interrupt electrical flow across each of said first pole said second pole and said third pole when an overload condition signal is applied to said neutral-ground RMS reactive breaker control mechanism;
an ac to dc converter having a converter output terminal and being electrically connected to said first conductor, said second conductor, and said third conductor, wherein said ac to dc converter is adapted to convert at least a portion of said first alternating current, said second alternating current, and/or said third alternating current, to direct current power and output said direct current power through said converter output terminal;
a voltage detection module having a plurality of electrical components, a signal output terminal electrically connected to said breaker control mechanism input, a neutral wire input electrically connected to said neutral wire, a ground wire input electrically connected to said ground wire, a power wire input electrically connected to said converter output terminal; wherein said plurality of electrical components includes a plurality of active electronic components; wherein said plurality of electrical components is adapted to monitor an RMS voltage between said neutral wire and said ground wire using said plurality of active electronic components powered by at least a portion of said direct current power delivered from said converter output terminal to said power wire input; wherein said plurality of electronic components is adapted to assert said overload condition signal to said neutral-ground RMS reactive breaker control mechanism when said plurality of electrical components have determined that said RMS voltage between said neutral wire and said ground wire is greater than a pre-determined voltage value for a pre-determined duration; and
a zero-crossing activated switch having an overload condition signal input electrically connected to said signal output terminal, said zero crossing activated switch being adapted to prohibit conduction of said overload condition signal to said neutral-ground RMS reactive breaker control mechanism until said zero crossing activated switch determines that at least one of said first alternating current, said second alternating current, and said third alternating current crosses zero relative to said neutral signal.

2. The system of claim 1, wherein said zero-crossing activated switch is a semiconductor having a base lead, a collector lead and an emitter lead; wherein said emitter lead is electrically associated with one of said first circuit conductor, said second circuit conductor, and said third circuit conductor to monitor one of an applied of said first alternating current, said second alternating current, and said third alternating current; wherein said collector lead is electrically associated with neutral; and wherein said zero-crossing activated switch prohibits conduction of said overload conduction signal to said neutral-ground RMS reactive breaker control mechanism by remaining electrically open until said zero-crossing activated switch determines that said applied of said first alternating current, said second alternating current, and said third alternating current is at zero cross relative to said neutral.

3. A method, comprising:
applying a first alternating current to a first circuit conductor;
applying a second alternating current to a second circuit conductor;
applying a third alternating current to a third circuit conductor;
monitoring said first alternating current, said second alternating current, and said third alternating current using at least one pilot device in a three pole circuit breaker;
converting a portion of said first alternating current, said second alternating current, and/or said third alternating current to direct current power;
carrying a neutral wire voltage on a neutral wire, wherein said neutral wire voltage corresponds to an imbalance between power carried on said first circuit conductor, said second circuit conductor and said third circuit conductor;
monitoring an RMS difference between said neutral wire and a ground wire using a plurality of passive and active components in a voltage detection module, wherein said active components are powered by said direct current power;
interrupting electrical flow across each of said first pole, said second pole and said third pole by tripping a common trip breaker in response to said active and passive components having determined that said RMS difference between said neutral wire voltage and said ground wire is greater than a pre-determined threshold voltage value for a pre-determined duration;
wherein said monitoring said RMS difference between said neutral wire and said ground wire comprises:
generating a filtered voltage signal by removing all frequency components above 10 KHz between said neutral wire and said ground wire;
converting said filtered voltage signal to said RMS difference;
comparing said RMS difference to said pre-determined voltage value; and
measuring a duration for which said RMS difference continuously exceeds said pre-determined voltage value.

4. The method of claim 3, wherein said tripping a common trip breaker step comprises:
asserting an overload condition signal from said voltage detection module to a zero-crossing activated switch; and
conducting said overload conditional signal from said zero-crossing activated switch to a neutral-ground RMS reactive breaker control mechanism adapted to trip said common trip breaker in response to at least one of said first alternating current, said second alternating current, and said third alternating current crossing zero relative to neutral.

5. The method of claim 3, asserting an overload signal from said voltage detection module to said common circuit breaker.

6. A method, comprising:
applying a first alternating current to a first circuit conductor;
applying a second alternating current to a second circuit conductor;
applying a third alternating current to a third circuit conductor;
monitoring said first alternating current, said second alternating current, and said third alternating current using at least one pilot device in a three pole circuit breaker;
converting a portion of said first alternating current, said second alternating current, and/or said third alternating current to direct current power;
carrying a neutral wire voltage on a neutral wire, wherein said neutral wire voltage corresponds to an imbalance between power carried on said first circuit conductor, said second circuit conductor and said third circuit conductor;
monitoring an RMS difference between said neutral wire and a ground wire using a plurality of passive and active components in a voltage detection module, wherein said active components are powered by said direct current power;
interrupting electrical flow across each of said first pole, said second pole and said third pole by tripping a common trip breaker in response to said active and passive components having determined that said RMS difference between said neutral wire voltage and said ground wire is greater than a pre-determined threshold voltage value for a pre-determined duration;
wherein said tripping a common trip breaker step comprises:
asserting an overload condition signal from said voltage detection module to a zero-crossing activated switch; and
conducting said overload conditional signal from said zero-crossing activated switch to a neutral-ground RMS reactive breaker control mechanism adapted to trip said common trip breaker in response to at least one of said first alternating current, said second alternating current, and said third alternating current crossing zero relative to neutral.

7. The method according to claim 6, asserting an overload circuit signal from said voltage detection module to said common circuit breaker.

8. The method of claim 6, wherein said monitoring said RMS difference between said neutral wire and said ground wire comprises:
generating a filtered voltage signal by removing all frequency components above 10 KHz between said neutral wire and said ground wire;
converting said filtered voltage signal to said RMS difference;
comparing said RMS difference to said pre-determined voltage value; and
measuring a duration for which said RMS difference continuously exceeds said pre-determined voltage value.

* * * * *